(12) United States Patent
Chen et al.

(10) Patent No.: US 10,366,163 B2
(45) Date of Patent: Jul. 30, 2019

(54) KNOWLEDGE-GUIDED STRUCTURAL ATTENTION PROCESSING

(71) Applicant: Microsoft Technology Licensing, LLC, Redmond, WA (US)

(72) Inventors: Yun-Nung Chen, Bellevue, WA (US); Dilek Z. Hakkani-Tur, Los Altos, CA (US); Gokhan Tur, Redmond, WA (US); Asli Celikyilmaz, Kirkland, WA (US); Jianfeng Gao, Woodinville, WA (US); Li Deng, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 118 days.

(21) Appl. No.: 15/258,639

(22) Filed: Sep. 7, 2016

(65) Prior Publication Data
US 2018/0067923 A1 Mar. 8, 2018

(51) Int. Cl.
*G06F 17/27* (2006.01)
*G10L 15/18* (2013.01)
*G10L 15/16* (2006.01)

(52) U.S. Cl.
CPC ...... *G06F 17/2785* (2013.01); *G06F 17/2705* (2013.01); *G10L 15/16* (2013.01); *G10L 15/1822* (2013.01)

(58) Field of Classification Search
None
See application file for complete search history.

(56) References Cited

U.S. PATENT DOCUMENTS

| 5,832,429 A | 11/1998 | Gammel et al. |
| 6,615,178 B1 | 9/2003 | Tajima |
| 9,239,828 B2 | 1/2016 | Yao et al. |

(Continued)

FOREIGN PATENT DOCUMENTS

| CN | 104538028 A | 4/2015 |
| JP | 2007127896 A | 5/2007 |

OTHER PUBLICATIONS

Sutskever, et al., "Sequence to Sequence Learning with Neural Networks", In Proceedings of Annual Conference on Neural Information Processing Systems, Dec. 8, 2014, pp. 1-9.

(Continued)

*Primary Examiner* — Thuykhanh Le
(74) *Attorney, Agent, or Firm* — International IP Law Group, PLLC

(57) ABSTRACT

Systems and methods for determining knowledge-guided information for a recurrent neural networks (RNN) to guide the RNN in semantic tagging of an input phrase are presented. A knowledge encoding module of a Knowledge-Guided Structural Attention Process (K-SAP) receives an input phrase and, in conjunction with additional sub-components or cooperative components generates a knowledge-guided vector that is provided with the input phrase to the RNN for linguistic semantic tagging. Generating the knowledge-guided vector comprises at least parsing the input phrase and generating a corresponding hierarchical linguistic structure comprising one or more discrete sub-structures. The sub-structures may be encoded into vectors along with attention weighting identifying those sub-structures that have greater importance in determining the semantic meaning of the input phrase.

20 Claims, 5 Drawing Sheets

(56) References Cited

U.S. PATENT DOCUMENTS

| | | | |
|---|---|---|---|
| 9,836,671 B2* | 12/2017 | Gao | G06F 16/3347 |
| 2004/0167778 A1 | 8/2004 | Valsan et al. | |
| 2004/0186730 A1 | 9/2004 | Sun et al. | |
| 2005/0055209 A1* | 3/2005 | Epstein | G10L 15/1815 704/255 |
| 2005/0105712 A1* | 5/2005 | Williams | G10L 13/027 379/265.02 |
| 2006/0074634 A1* | 4/2006 | Gao | G06F 17/271 704/9 |
| 2006/0129396 A1* | 6/2006 | Ju | G10L 15/063 704/243 |
| 2006/0253273 A1* | 11/2006 | Feldman | G06F 17/2715 704/9 |
| 2007/0010900 A1* | 1/2007 | Kavaklioglu | C10G 11/187 700/26 |
| 2007/0094006 A1* | 4/2007 | Todhunter | G06F 17/2785 704/8 |
| 2007/0225977 A1* | 9/2007 | Emam | G06F 17/273 704/235 |
| 2007/0260450 A1* | 11/2007 | Sun | G06F 16/322 704/9 |
| 2009/0030686 A1* | 1/2009 | Weng | G10L 15/1822 704/240 |
| 2009/0063473 A1* | 3/2009 | Van Den Berg | G06F 16/3344 |
| 2010/0030552 A1* | 2/2010 | Chen | G06F 16/367 704/9 |
| 2011/0054883 A1* | 3/2011 | Yun | G06F 17/2755 704/9 |
| 2011/0087483 A1* | 4/2011 | Hsieh | G06F 17/27 704/9 |
| 2012/0197631 A1* | 8/2012 | Ramani | G06F 17/2755 704/9 |
| 2012/0239378 A1* | 9/2012 | Parfentieva | G06F 17/2785 704/4 |
| 2013/0268260 A1 | 10/2013 | Lundberg et al. | |
| 2013/0325436 A1* | 12/2013 | Wang | G06F 17/2715 704/9 |
| 2014/0113263 A1* | 4/2014 | Jarrell | G09B 19/00 434/262 |
| 2014/0236577 A1 | 8/2014 | Malon et al. | |
| 2014/0278355 A1* | 9/2014 | Sarikaya | G06F 17/28 704/9 |
| 2015/0066496 A1* | 3/2015 | Deoras | G10L 15/16 704/232 |
| 2015/0161101 A1* | 6/2015 | Yao | G06N 3/0472 704/9 |
| 2015/0178265 A1 | 6/2015 | Anderson et al. | |
| 2015/0199333 A1* | 7/2015 | Nekhay | G06F 17/278 704/9 |
| 2015/0269949 A1 | 9/2015 | Chang et al. | |
| 2015/0332049 A1* | 11/2015 | Chen | G06F 21/57 726/22 |
| 2015/0347521 A1* | 12/2015 | Zhu | G06F 17/30525 715/230 |
| 2016/0124943 A1* | 5/2016 | Zu | G06F 17/2827 704/4 |
| 2016/0350655 A1* | 12/2016 | Weiss | G06N 3/088 |
| 2017/0270919 A1* | 9/2017 | Parthasarathi | G10L 15/20 |
| 2017/0372200 A1 | 12/2017 | Chen et al. | |

OTHER PUBLICATIONS

Graves, Alex, "Supervised Sequence Labelling with Recurrent Neural Networks", In Doctoral Dissertation of University of Munich, Aug. 7, 2015, 124 pages.

Chopra, et al., "Abstractive Sentence Summarization with Attentive Recurrent Neural Networks", In Proceedings of Conference of the North American Chapter of the Association for Computational Linguistics: Human Language Technologies, Jun. 12, 2016, 6 pages.

Mnih, et al., "Recurrent Models of Visual Attention", In Proceedings of Annual Conference on Neural Information Processing Systems, Dec. 8, 2014, pp. 1-9.

"Attention and Memory in Deep Learning and Nlp", Published on: Jan. 3, 2016, 11pages. Available at: http://www.wildml.com/2016/01/attention-and-memory-in-deep-learning-and-nlp/.

Zeng, et al., "Relation Classification via Convolutional Deep Neural Network", In Proceedings of the 25th International Conference on Computational Linguistics, Aug. 23, 2014, pp. 2335-2344.

Zhang, et al., "Relation Classification via Recurrent Neural Network", In CSLT Technical Report, Oct. 16, 2015, pp. 1-13.

Shen, et al., "Neural Attention Models for Sequence Classification: Analysis and Application to Key Term Extraction and Dialogue Act Detection", In Proceedings of Computing Research Repository, Apr. 2016, 5 pages.

Celikyilmaz, et al., "Enriching Word Embeddings Using Knowledge Graph for Semantic Tagging in Conversational Dialog Systems", In Proceedings of Association for the Advancement of Artificial Intelligence, Jan. 19, 2015, 4 pages.

Mikolov, et al., "Recurrent neural network based language model", In Proceedings of 11th Annual Conference of the International Speech Communication Association, Sep. 26, 2010, pp. 1045-1048.

Peng, et al., "Learning word segmentation representations to improve named entity recognition for chinese social media", In Journal of Computing Research Repository, Mar. 2016, 6 pages.

Mesnil, et al., "Using recurrent neural networks for slot filling in spoken language understanding", In Journal of IEEE Transactions on Audio, Speech, and Language Processing, vol. 23, Issue 3, Mar. 2015, pp. 530-539.

Yih, et al., "Semantic parsing via staged query graph generation: Question answering with knowledge base", In Proceedings of the 53rd Annual Meeting of the Association for Computational Linguistics, Jul. 26, 2015, 12 pages.

Berant, et al., "Semantic parsing on freebase from question-answer pairs", In Proceedings of the Conference on Empirical Methods in Natural Language Processing, Oct. 18, 2013, 12 pages.

Heck, et al., "Leveraging knowledge graphs for web-scale unsupervised semantic parsing", In Proceedings of 14th Annual Conference of the International Speech Communication Association, Aug. 25, 2013, 24 pages.

Ma, et al., "Knowledge graph inference for spoken dialog systems", In Proceedings of IEEE International Conference on Acoustics, Speech and Signal Processing, Apr. 19, 2015, pp. 5346-5350.

Chen, et al., "Deriving local relational surface forms from dependency-based entity embeddings for unsupervised spoken language understanding", In Proceedings of IEEE Spoken Language Technology Workshop, Dec. 7, 2014, pp. 242-247.

Chen, et al., "Matrix factorization with knowledge graph propagation for unsupervised spoken language understanding", In Proceedings of the 53rd Annual Meeting of the Association for Computational Linguistics, Jul. 26, 2015, 12 pages.

Liu, et al., "Query understanding enhanced by hierarchical parsing structures", In Proceedings of IEEE Workshop on Automatic Speech Recognition and Understanding, Dec. 8, 2013, pp. 72-77.

Socher, et al., "Grounded Compositional Semantics for Finding and Describing Images with Sentences", In Journal of Transactions of the Association for Computational Linguistics, vol. 2, Apr. 2014, pp. 207-218.

Tur, et al., "Spoken language understanding: Systems for extracting semantic information from speech", In Publications of John Wiley & Sons, Mar. 23, 2011.

Wang, et al., "Spoken Language Understanding", In IEEE Signal Processing Magazine, vol. 22, Issue 5, Sep. 2005, pp. 16-31.

Raymond, et al., "Generative and Discriminative Algorithms for Spoken Language Understanding", In Proceedings of 8th Annual Conference of the International Speech Communication Association, Aug. 27, 2007, 4 pages.

Xu, et al., "Convolutional Neural Network Based Triangular CRF for Joint Intent Detection and Slot Filling", In Proceedings of IEEE Workshop on Automatic Speech Recognition and Understanding, Dec. 8, 2013, 6 pages.

Yao, et al., "Recurrent Neural Networks for Language Understanding", In Proceedings of 14th Annual Conference of the International Speech Communication Association, Aug. 25, 2013, 5 pages.

(56) References Cited

OTHER PUBLICATIONS

Mikolov, et al., "Distributed Representations of Words and Phrases and their Compositionality", In Proceedings of 27th Annual Conference on Neural Information Processing Systems, Dec. 5, 2013, pp. 1-9.
Ling, et al., "Finding Function in Form: Compositional Character Models for Open Vocabulary Word Representation", In Proceedings of Conference on Empirical Methods in Natural Language Processing, Sep. 17, 2015, pp. 1520-1530.
Le, et al., "Distributed Representations of Sentences and Documents", In Proceedings of the 31st International Conference on Machine Learning, Jun. 21, 2014, 9 pages.
Celikyilmaz, et al., "Convolutional Neural Network Based Semantic Tagging with Entity Embeddings", In Proceedings of NIPS Workshop on Machine Learning for SLU & Interaction, Dec. 2015, pp. 1-7.
Yang, et al., "Embedding Entities and Relations for Learning and Inference in Knowledge Bases", In Proceedings of International Conference on Learning Representations, May 7, 2015, pp. 1-12.
Ma, et al., "Dependency-based Convolutional Neural Networks for Sentence Embedding", In Proceedings of the 53rd Annual Meeting of the Association for Computational Linguistics and the 7th International Joint Conference on Natural Language Processing, Jul. 26, 2015, pp. 174-179.
Tai, et al., "Improved Semantic Representations From Tree-Structured Long Short-Term Memory Networks", In Proceedings of 53rd Annual Meeting of the Association for Computational Linguistics and the 7th International Joint Conference on Natural Language Processing, Jul. 26, 2015, pp. 1556-1566.
Weston, et al., "Memory Networks", In Proceedings of International Conference on Learning Representations, May 7, 2015, pp. 1-15.
Xiong, et al., "Dynamic Memory Networks for Visual and Textual Question Answering", In Proceedings of Computing Research Repository, Mar. 2016, 10 pages.
Stollenga, et al., "Deep Networks with Internal Selective Attention through Feedback Connections", In Proceedings of Advances in Neural Information Processing Systems, Dec. 8, 2014, pp. 1-9.
Xu, et al., "Show, Attend and Tell: Neural Image Caption Generation with Visual Attention", In Proceedings of Computing Research Repository, Feb. 2015, 22 pages.
Chen, et al., "A Fast and Accurate Dependency Parser using Neural Networks", In Proceedings of Conference on Empirical Methods in Natural Language Processing, Oct. 25, 2014, 11 pages.
L. Elman, Jeffrey, "Finding Structure in Time", In Journal of Cognitive Science, vol. 14, Apr. 1990, pp. 179-211.
Kingma, et al., "Adam: A Method for Stochastic Optimization", In Proceedings of Computing Research Repository, Dec. 2014, pp. 1-15.
Cho, et al., "On the Properties of Neural Machine Translation: Encoder-Decoder Approaches", In Proceedings of Computing Research Repository, Sep. 2014, 9 pages.
Chung, et al., "Empirical Evaluation of Gated Recurrent Neural Networks on Sequence Modeling", In Proceedings of Computing Research Repository, Dec. 2014, pp. 1-9.
Kim, Yoon, "Convolutional Neural Networks for Sentence Classification", In Proceedings of Computing Research Repository, Aug. 2014, 6 pages.
Hakkani-Tür, et al., "Multi-Domain Joint Semantic Frame Parsing using Bi-directional RNN-LSTM", In Proceedings of 17th Annual Meeting of the International Speech Communication Association, Jun. 24, 2016, 5 pages.
"Implementing Dynamic Memory Networks", Retrieved From: https://yerevann.github.io/2016/02/05/implementing-dynamic-memory-networks/, Feb. 5, 2016, 10 Pages.
"Inside Speech Recognition", Retrieved From: http://www.tldp.org/HOWTO/Speech-Recognition-HOWTO/inside.html, Oct. 18, 2002, 2 Pages.
Bahdanau, "Neural Machine Translation by Jointly Learning to Align and Translate", In Proceedings of the International Conference on Learning Representations, May 7, 2015, pp. 1-15.
Bhargava, et al., "Easy Contextual Intent Prediction and Slot Detection", In Proceedings of IEEE International Conference on Acoustics, Speech and Signal Processing, May 26, 2013, 5 Pages.
Bordes, et al., "Learning End-to-End Goal-Oriented Dialog", Retrieved from: https://arxiv.org/pdf/1605.07683v1.pdf, May 24, 2016, 11 Pages.
Chelba, et al., "Speech Utterance Classification", In Proceedings of the IEEE International Conference on Acoustics, Speech, and Signal Processing, Apr. 6, 2003, 4 Pages.
Chen, et al., "End-to-End Memory Networks with Knowledge Carryover for Multi-Turn Spoken Language Understanding", In Proceedings of the Conference of the International Speech Communication Association, Sep. 8, 2016, pp. 3245-3249.
Chu-Carroll, Jennifer, "A Statistical Model for Discourse Act Recognition in Dialogue Interaction", In Proceedings of the AAAI Spring Symposium on Applying Machine Learning to Discourse Processing, Technical Report SS-98-01, Jan. 1998, pp. 12-17.
Deng, et al., "Use of Kernel Deep Convex Networks and End-To-End Learning for Spoken Language Understanding", In Proceedings of IEEE Spoken Language Technology Workshop (SLT), Dec. 2, 2012, pp. 210-215.
Deoras, et al., "Deep Belief Network Based Semantic Taggers for Spoken Language Understanding", In Proceedings of 14th Annual Conference of the International Speech Communication Association, Aug. 25, 2013, 5 Pages.
Graves, et al., "Neural Turing Machines", Retrieved From: https://arxiv.org/pdf/1410.5401.pdf, Dec. 10, 2014, pp. 1-26.
Graves, et al., "Speech Recognition with Deep Recurrent Neural Networks", In Proceedings of IEEE International Conference on Acoustics, Speech and Signal Processing, May 26, 2013, pp. 6645-6649.
Haffner, et al., "Optimizing SVMS for Complex Call Classification", In Proceedings of IEEE International Conference on Acoustics, Speech, and Signal Processing, vol. 1, Apr. 6, 2003, pp. 632-635.
Hochreiter, et al., "Long Short-Term Memory", In Journal of Neural Computation, vol. 9, Issue 8, Nov. 15, 1997, pp. 1735-1780.
Jozefowicz, et al., "An Empirical Exploration of Recurrent Network Architectures", In Proceedings of the 32nd International Conference on Machine Learning, Jun. 1, 2015, 9 Pages.
Kumar, et al., "Ask Me Anything: Dynamic Memory Networks for Natural Language", In Proceedings of the International Conference on Machine Learning, Jun. 11, 2016, 10 Pages.
Liu, et al., "Deep Contextual Language Understanding in Spoken Dialogue Systems", In Proceedings of 16th Annual Conference of the International Speech Communication Association, Sep. 6, 2015, 5 Pages.
"International Search Report and Written Opinion Issued in PCT Application No. PCT/US2017/038210", dated Sep. 22, 2017, 12 Pages.
Pieraccini, et al., "A Speech Understanding System Based on Statistical Representation of Semantics", In Proceedings of IEEE International Conference on Acoustics, Speech, and Signal Processing, Mar. 23, 1992, pp. 193-196.
Ravuri, et al., "Recurrent Neural Network And LSTM Models For Lexical Utterance Classification", In Proceedings of 16th Annual Conference of the International Speech Communication Association, Sep. 6, 2015, pp. 135-139.
Sarikaya, et al., "Application of Deep Belief Networks for Natural Language Understanding", In Proceedings of IEE/ACM Transactions on Audio, Speech, and Language Processing, vol. 22, Issue 4, Apr. 1, 2014, 7 Pages.
Sarikaya, et al., "Deep Belief Nets for Natural Language Call-Routing", In Proceedings of IEEE International Conference on Acoustics, Speech and Signal Processing, May 22, 2011, 4 Pages.
Shi, et al., "Contextual Spoken Language Understanding Using Recurrent Neural Networks", In Proceedings of the International IEEE Conference on Acoustics, Speech and Signal Processing, Apr. 19, 2015, pp. 5271-5275.
Sukhbaatar, et al., "End-To-End Memory Networks", In Proceedings of Twenty-ninth Conference on Neural Information Processing Systems, Dec. 7, 2015, pp. 1-11.

(56) References Cited

OTHER PUBLICATIONS

Tur, et al., "Towards Deeper Understanding: Deep Convex Networks for Semantic Utterance Classification", In Proceedings of IEEE International Conference on Acoustics, Speech and Signal Processing, Mar. 25, 2012, pp. 5045-5048.

Xu, et al., "Contextual Domain Classification in Spoken Language Understanding Systems Using Recurrent Neural Network", In Proceedings of IEEE International Conference on Acoustics, Speech and Signal Processing, May 4, 2014, 5 Pages.

Yao, et al., "Spoken Language Understanding Using Long Short-term Memory Neural Networks", In Proceedings of the IEEE Spoken Language Technology Workshop, Dec. 7, 2014, pp. 189-194.

"Non Final Office Action Issued in U.S. Appl. No. 15/229,039", dated May 23, 2019, 25 Pages.

\* cited by examiner

US 10,366,163 B2

KNOWLEDGE-GUIDED STRUCTURAL ATTENTION PROCESSING

CROSS-REFERENCE TO RELATED APPLICATION

This application is related to co-pending and commonly assigned U.S. patent application Ser. No. 15/229,039, filed Jun. 23, 2016, entitled "End-to-End Memory Networks for Contextual Language Understanding," which is incorporated by reference.

BACKGROUND

Tagging of word and sentence sequences with semantic classes is crucial for natural language processing. Tagging is the identification of meaning and semantics of words and sequences in a "turn", spoken language that is processed as a discrete instance. Recently, recurrent neural networks (RNNs) with long short-term memory (LSTM) cell structure demonstrated strong results on sequence tagging tasks in natural language processing due to their ability of preserving sequential information from multiple turns of spoken language over time. Generally, however, these RNNs assign tags to sequences considering only their flat structures, i.e., a linear chain of words/phrases. However, natural language exhibits inherent syntactic properties that provide rich, structured tree or tree-like information, which should help computer systems with for better understanding of natural language sentences or phrases, spoken or textual.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods for determining knowledge-guided information for a recurrent neural networks (RNN) to guide the RNN in semantic tagging of an input phrase are presented. A knowledge encoding module of a Knowledge-Guided Structural Attention Process (K-SAP) receives an input phrase and, in conjunction with additional sub-components or cooperative components generates a knowledge-guided vector that is provided with the input phrase to the RNN for linguistic semantic tagging. Generating the knowledge-guided vector comprises at least parsing the input phrase and generating a corresponding hierarchical linguistic structure comprising one or more discrete sub-structures. The sub-structures may be encoded into vectors along with attention weighting identifying those sub-structures that have greater importance in determining the semantic meaning of the input phrase.

According to aspects of the disclosed subject matter, a computer-implemented method for providing structural linguistic knowledge to a semantic tagging process is presented. The method includes receiving an input phrase to be semantically tagged. A hierarchical structure of the input phrase is generated, where the hierarchical structure comprises one or more discrete sub-structures. For each of the discrete sub-structures, an attention weight is determined according to the linguistic importance of the sub-structure, and the determined attention weight is associated to or with each discrete sub-structure. A weighted sum vector is generated according to the content of each discrete sub-structure and according to the corresponding attention weight of the discrete sub-structures. The weighted sum vector is combined with an input vector based on the subject matter of the input phrase, thereby generating a knowledge-guided vector corresponding to the input phrase. The knowledge-guided vector and the input phrase are then to a recurrent neural network (RNN) for semantic tagging.

According to additional aspects of the disclosed subject matter, a computer system for providing structural linguistic knowledge to a semantic tagging process is presented. The computer system includes a processor and a memory, where the processor executes instructions in the memory as part of or in conjunction with additional components in providing structural linguistic knowledge to a semantic tagging process. The additional components include a knowledge encoding module that receives an input phrase, determines a knowledge-guided vector for the input phrase, and provides the knowledge-guided vector with the input phrase to a recurrent neural network (RNN) for semantic tagging of the input phrase.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
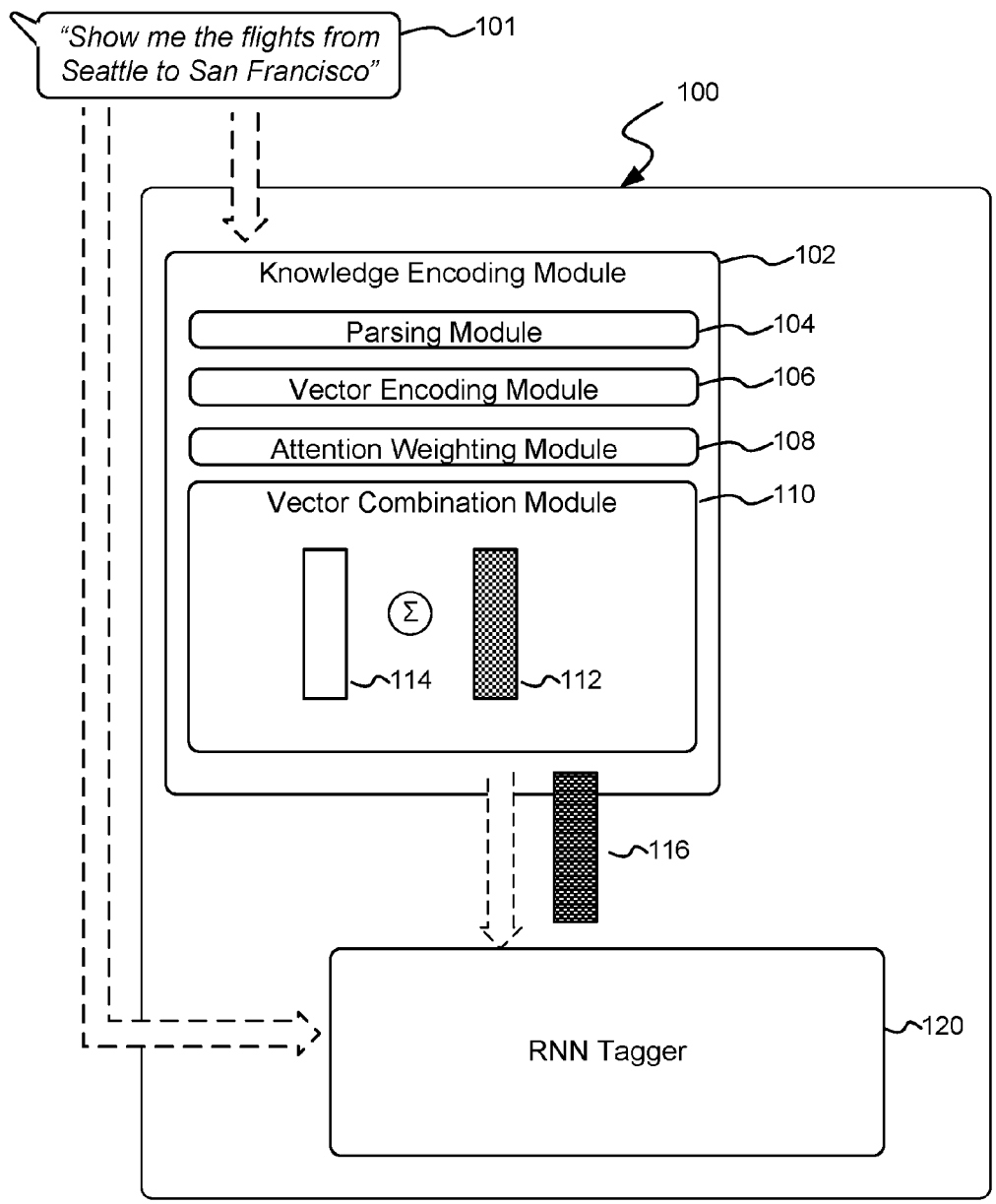
FIG. 1 is a block diagram illustrating an exemplary executable components of a knowledge-guided structural attention processing (K-SAP) framework configured according to aspects of the disclosed subject matter.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

As indicated above and by way of definition, the term "turn" should be interpreted as being a discrete spoken sentence or utterance, as an instance of spoken dialog to be processed by spoken language understanding (SLU) component. By way of illustration, dialogue or conversations typically involve multiple turns. Additionally, the term "semantic parsing" should be interpreted as the parsing of input, e.g., one or more turns or a query, to identify parts and/or characteristics of the input. Semantic parsing can include identifying a domain and an intent of the input, and assigning words of the input to slots, though other terminologies may also be included in semantic parsing, including domains, dialogues, constraint slots, and requested slots, combination of action and requested slots, and equivalents thereof. The term "domain" represents a category identified for an input from semantic parsing, and the term "slot" represents a constraint for a query or argument for an API for semantic parsing.

Recurrent neural networks (RNNs), such as those described in co-pending and commonly assigned U.S. patent application Ser. No. 15/229,039, entitled "End-to-End Memory Networks for Contextual Language Understanding," can concisely capture information/knowledge from processing turns due to the feedback connections from one time step to another, making them suitable for modeling sequential data with temporal dependencies. Indeed, they have demonstrated success in processing and sequencing tagging tasks with regard to language modeling, particularly spoken language understanding (SLU). Unfortunately, RNNs consider the models of the various turns as flat structures—i.e., without hierarchical/structural semantic relationships and information, thus ignoring structured information that is typically present in natural language sequence. Indeed, hierarchical structures and semantic relationships contain linguistic characteristics of input word sequences that form sentences. This information (the hierarchical structures and/or semantic relationships) would be valuable in tagging sequences, especially when tagging previously un-encountered sequences. In contrast and according to aspects of the disclosed subject matter, knowledge-guided structural attention processing (K-SAP) incorporates non-flat network topologies guided by prior knowledge and end-to-end knowledge-guided structural learning, and provides for generalization for different knowledge bases and efficacy of processing. In particular, in regard to incorporating non-flat network topologies guided by prior knowledge, the disclosed subject matter identifies important substructures captured from small training data, and allows the model to generalize information to previously unseen test data. Also the model automatically figures out the important substructures that are essential to predict the tags of the sequence of words and/or sentences, so that the understanding performance can be improved. Regarding the generalization for different knowledge bases, there is no required schema of knowledge, and different types of parsing results, such as dependency relations, knowledge graph-specific relations, and parsing output of hand-crafted grammars, can serve as the knowledge guidance in this model.

Figure 2:
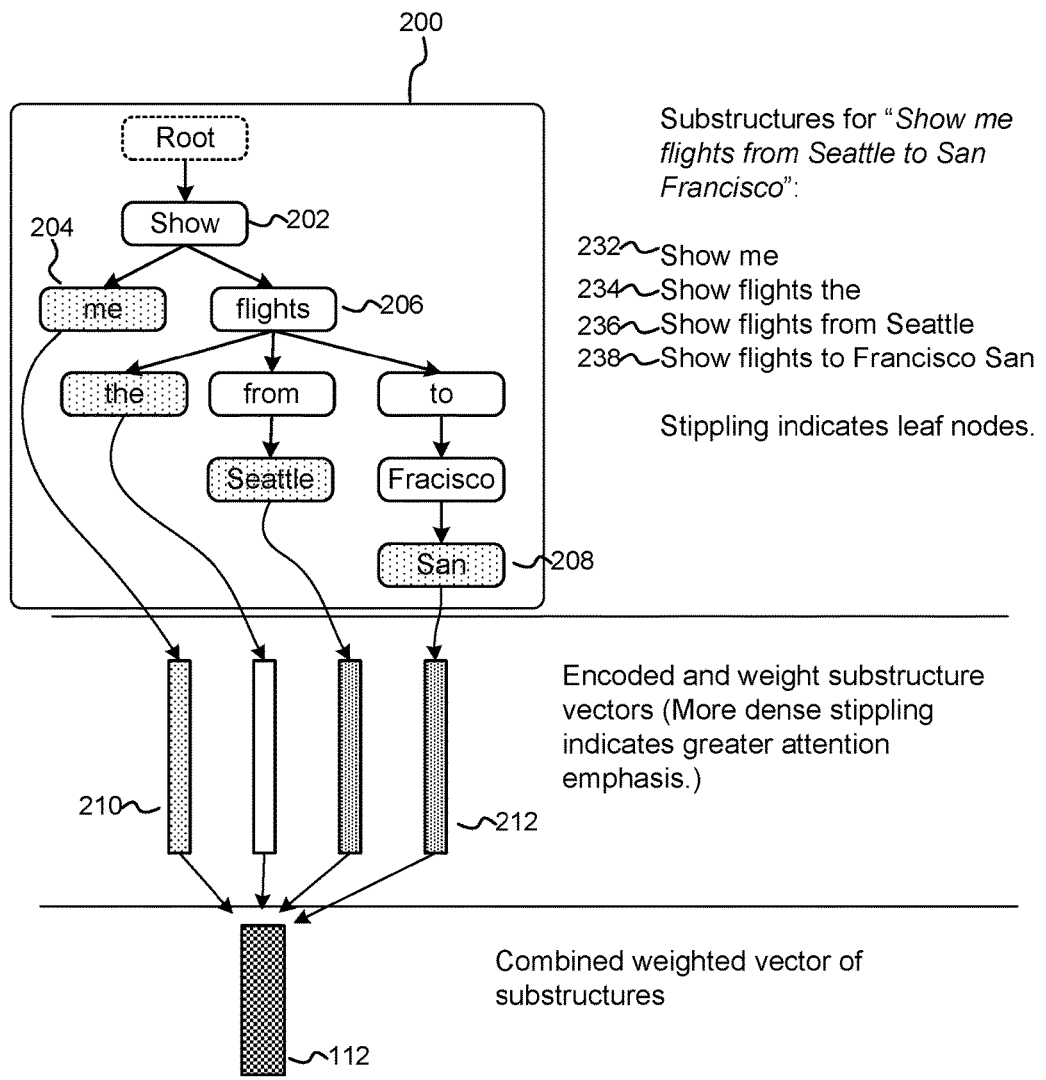
FIG. 2 is a block diagram illustrating the processing of an input phrase, "Show me the flights from Seattle to San Francisco," by a components/modules of the K-SAP framework.

In regard to a language understanding (LU) task and according to aspects of the disclosed subject matter, for any given utterance with a sequence of words/token $s=w_1, \ldots, w_T$, the K-SAP model predicts corresponding semantic tags $y=y_1, \ldots, y_T$ for each word/token by incorporating knowledge-guided structures. Turning, then, to FIGS. 1 and 2, FIG. 1 is a block diagram illustrating an exemplary executable components of a knowledge-guided structural attention processing (K-SAP) framework 100 configured according to aspects of the disclosed subject matter. FIG. 2 is a block diagram illustrating the processing 200 of an input phrase, "Show me the flights from Seattle to San Francisco," by a knowledge encoding module 102 of the K-SAP framework.

As shown in FIG. 1, the executable knowledge encoding module 102 includes various executable sub-components that cooperatively generate a knowledge-guided vector 116 that corresponds to the input phrase 101. This knowledge-guided vector 116 is then used by the RNN tagger 120 in tagging the various words and tokens of the input phrase. These sub-components include, by way of illustration and not limitation, a parsing module 104, a vector encoding module 106, an attention weighting module 108, and a vector combination module 110.

The parsing module 104, in execution, generates a linguistic, hierarchical structure of an input phrase. For example and with regard to the input phrase 101 ("Show me the flights from Seattle to Son Francisco"), the parsing module generates a hierarchical structure 200 comprising a discrete set of knowledge-guided substructures 232-238. According to aspects of the disclosed subject matter, the knowledge encoding module 102/parsing module 104 may rely upon external and local knowledge sources to identify and parse the input phrase into the hierarchical arrangement. In regard to the hierarchical structure, each sub-structure begins with the root node 202 ("Show") and follows a path down the structure to a leaf node, such as leaf nodes 204 and 208, including intermediate nodes, such as intermediate node 206 ("flights"), that are passed through.

Regarding the parsing module 104, the input phrase is parsed to identify paths from the root (the general purpose of the phrase) to the various leaves (individual words/terms.) The number of substructures that are identified may be less than the number of words in a given input phrase, such as input phrase 101, because non-leaf nodes do not have corresponding substructures to reduce the duplicated information in the model.

After generating the hierarchical structure 200, the discrete knowledge-guided substructures are encoded into corresponding vector representations by way of a vector encoding module 106, resulting in a generated set of vectors for the input phrase. For example, each of the various substructures 232-238 of the hierarchical structure 200 are encoded by the encoding module 106 into a continuous space vector, including encoded vectors 210 and 212. According to aspects of the disclosed subject matter, the vector encoding module 106 may utilize multiple models for encoding, alone or in combination. These encoding models include fully-connected neural networks (NNs) with linear activation, recurrent neural networks (RNNs), and/or convolutional neural networks (CNNs).

According to aspects of the disclosed subject matter, the K-SAP framework learns a phrase/sentence meaning/representation according to the various substructures, as represented by the various generated vectors. Further, in learning the meaning of a particular phrase according to the various substructures of the phrase, emphasis or weight is given (i.e., greater attention) to certain substructures over others by an attention weighting module 108. This greater attention is directed to those substructures that are viewed as more important to the sentence/phase in determining its meaning and encoded into the corresponding vectors. By way of illustration, attention levels are represented by the amount of shading in the encoded vectors 202-208, with the darker vectors indicating those substructures that should be afforded greater attention.

According to aspects of the disclosed subject matter, the levels of attention afforded to individual substructures (as captured in the corresponding vectors) are determined according to a variety of resources, including external resources. These resources may include information sources that indicate dependency relations in phrases, knowledge bases, as well as data regarding the person from whom the phrase originates. This prior knowledge provides richer information to help the RNN determine semantic tags to an input utterance, such as input phrase 101.

After weighting the various encoded vectors of the various sub-structures, a vector combination module 110 combines the encoded vectors into a weighted sum vector 112, the weighted sum vector representing the knowledge and attention weights to be applied to the input phrase. Indeed, the weighted sum vector 112 represents the attention to be paid to different sub-structures guided by external knowledge.

In addition to encoding the various sub-structures of the input phrase and generated the weighted sum vector 112, and according to aspects of the disclosed subject matter, the entire input phrase 101 is also encoded as an input vector 114 and combined with the weighed sum vector 112 to generate a knowledge-guided vector 116 to be used by an RNN tagger in tagging the words and tokens of the input phrase.

In regard to the weights associated with the various sub-structures of the input phrase, in one embodiment a matching score is determined between the encoded vectors of a substructure and the entire utterance (as represented by the input vector 114). This matching score may be determined according to the inner product of the two vectors followed by a softmax function (also referred to as a normalized exponential function), where the result can be viewed as the attention distribution for modeling input sub-structures from external knowledge in order to understand the current utterance. As will be readily appreciated, a softmax function is a gradient-log-normalizer of the categorical probability distribution. Indeed, the softmax function is often implemented at the final layer of a network used for classification. In various embodiments, a softmax function maps a vector and a specific index i to a real value.

Figure 3:
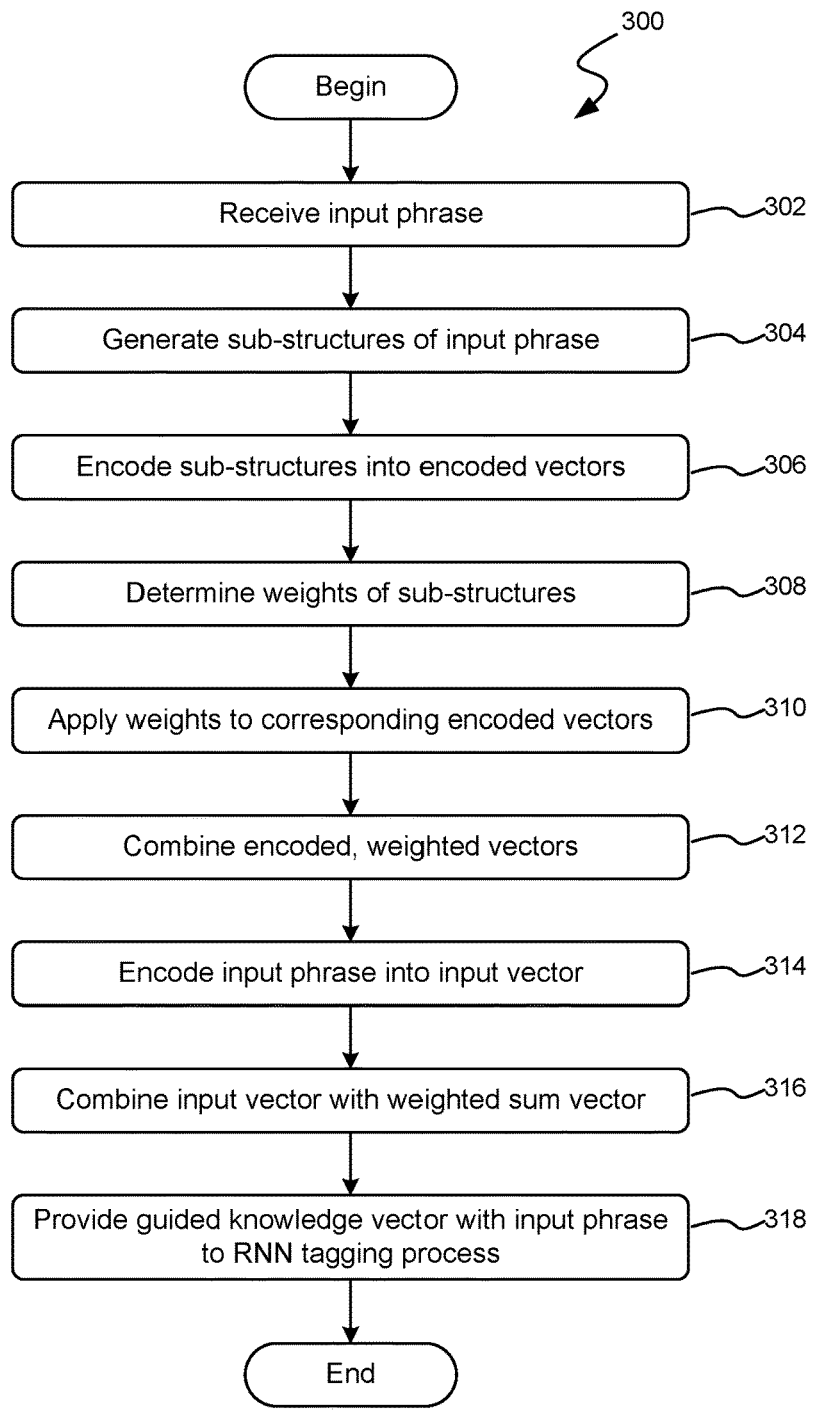
FIG. 3 is a flow diagram illustrating an exemplary routine for generating knowledge-guided information, in the form of a knowledge-guided vector, for use in an RNN tagging process.

Turning to FIG. 3, FIG. 3 is a flow diagram illustrating an exemplary routine 300 for generating knowledge-guided information, in the form of a knowledge-guided vector 116, for use in an RNN tagging process. Beginning at block 302, an input phrase to be tagged by an RNN tagging process is received. At block 304, a parsing module 104 of a knowledge encoding module 102 (or operating in cooperation with the knowledge encoding module) parses the input phrase into a hierarchical arrangement of sub-structures, as illustrated in FIG. 2. As indicated above, the hierarchical arrangement comprises one or more sub-structures.

At block 306, the subject matter of the various discrete sub-structures of the hierarchical arrangement are encoded into corresponding encoded vectors. At block 308, a determination as to the importance, and therefore the weighting, of each of the sub-structures is determined. At block 310, each of the encoded vectors is updated to reflect the determined importance of the corresponding sub-structure.

At block 312, the weighted, encoded vectors are then combined into a weighted sum vector 112, as described above. At block 314, the subject matter of the entire input vector is encoded as an input vector 114 and, at block 316, the input vector 114 and the weighted sum vector 112 are combined to generate a knowledge-guided vector 116.

The knowledge-guided vector 116 is then provided, with the input phrase 101, to a suitably configured recurrent neural network (RNN) for tagging of the input phrase, where in the RNN suitably configured to also accept the knowledge-guided vector 116 with the input phrase to guide the tagging process. Thereafter, the routine 300 terminates.

Regarding routine 300 described above, as well as other processes describe herein, while the routines/processes are expressed in regard to discrete steps, these steps should be viewed as being logical in nature and may or may not correspond to any specific actual and/or discrete steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the routines and/or processed include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code modules comprising routines, functions, looping structures, selectors and switches such as if-then and if-then-else statements, assignments, arithmetic computations, and the like that, in execution, configure a computing device to operate in accordance with the routines/processes. However, as suggested above, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer-executable instructions stored by computer-readable media, also referred to as computer-readable storage media, which are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this disclosure computer readable media expressly excludes carrier waves and/or propagated signals.

Figure 4:
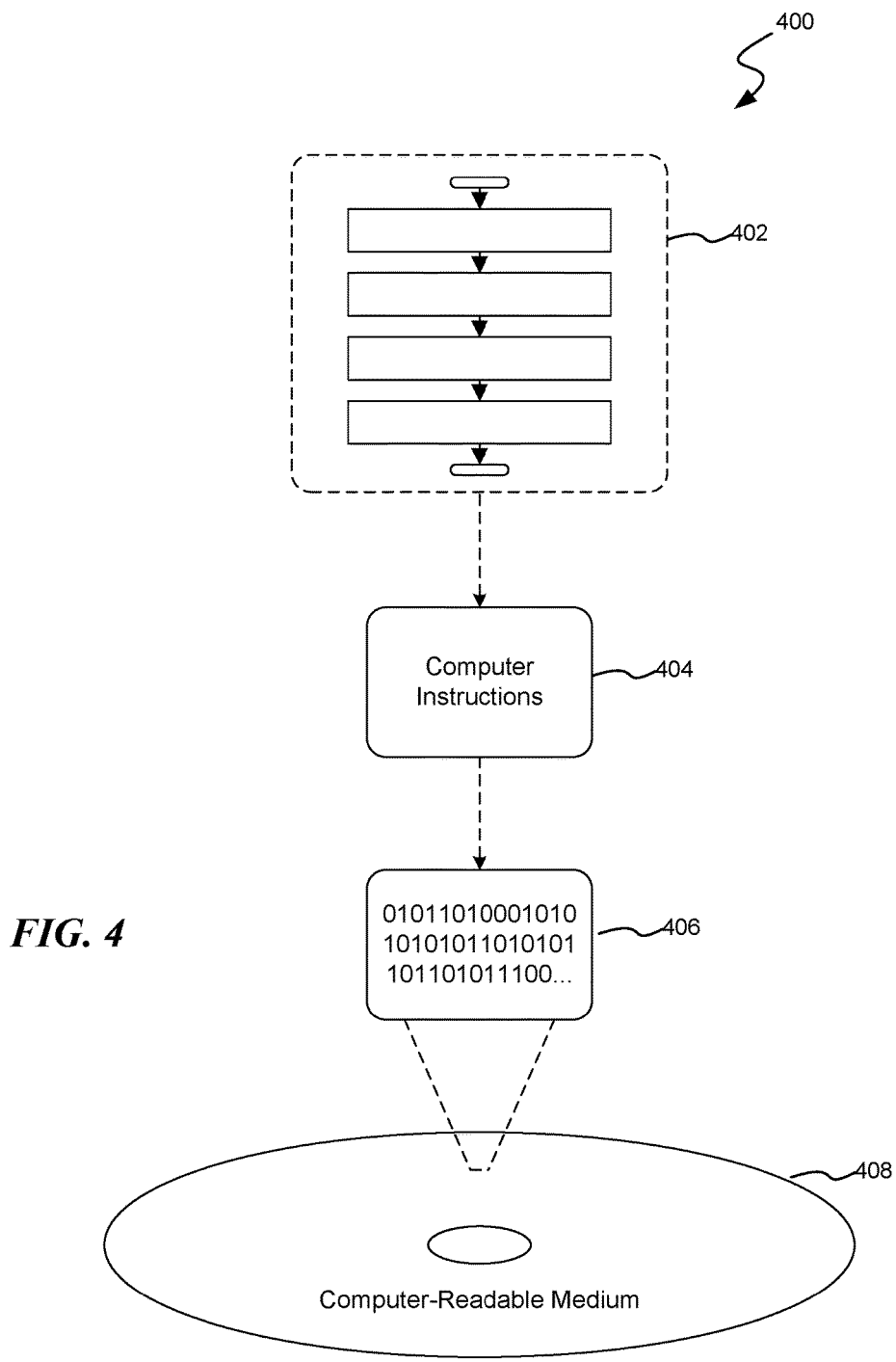
FIG. 4 is a block diagram illustrating an exemplary computer readable medium encoded with instructions to generate metadata in regard to an image, respond to an image request with the image and metadata, and/or request an image from an online image service.

Turning to FIG. 4, FIG. 4 is a block diagram illustrating an exemplary computer readable medium encoded with instructions to generate metadata in regard to an image, respond to an image request with the image and metadata, and/or request an image from an online image service as described above. More particularly, the implementation 400 comprises a computer-readable medium 408 (e.g., a CD-R, DVD-R or a platter of a hard disk drive), on which is encoded computer-readable data 406. This computer-readable data 406 in turn comprises a set of computer instructions 404 configured to operate according to one or more of the principles set forth herein. In one such embodiment 402, the processor-executable instructions 404 may be configured to perform a method, such as at least some of the exemplary method 300, for example. In another such embodiment, the processor-executable instructions 404 may be configured to implement a system, such as at least some of the exemplary system 500, as described below. Many such computer-readable media may be devised, by those of ordinary skill in the art, which are configured to operate in accordance with the techniques presented herein.

Figure 5:
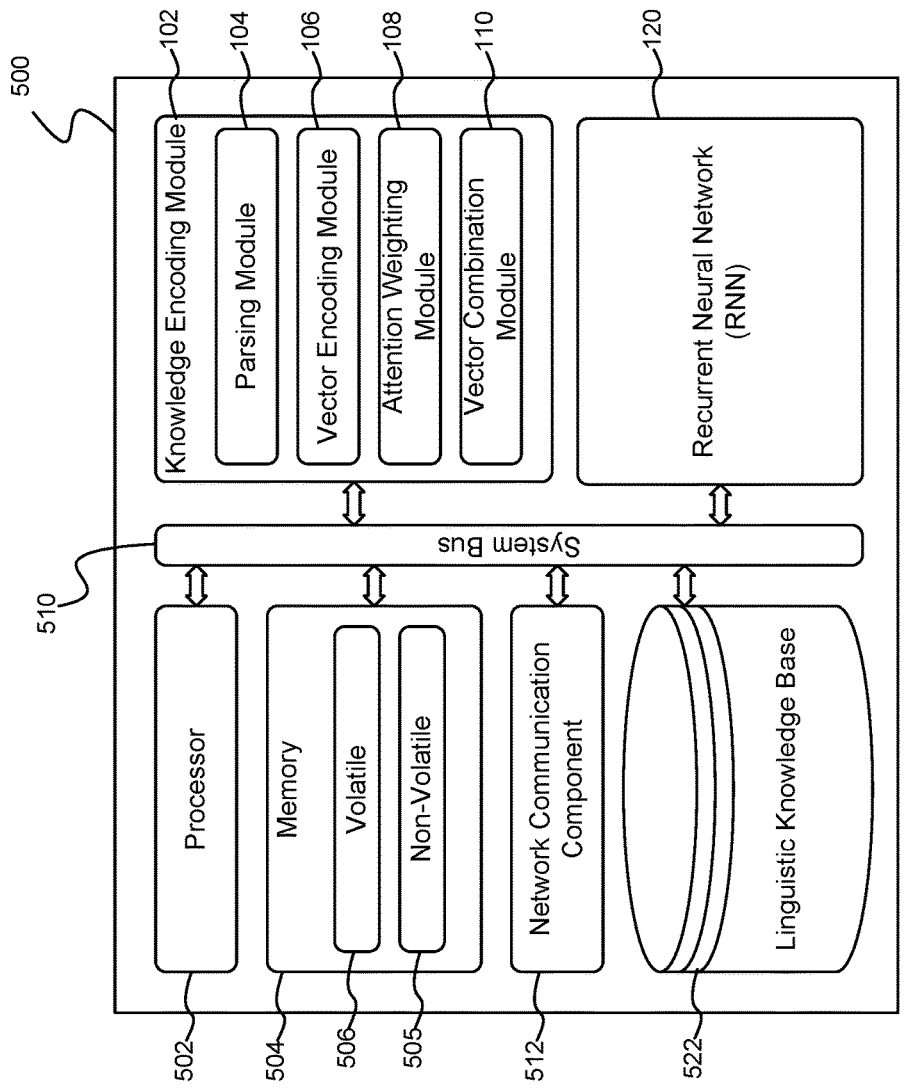
FIG. 5 is a block diagram illustrating an exemplary computing device configured to generate and provide a knowledge-guided vector with the input phrase to guide the tagging process of an RNN tagging module/service.

Turning now to FIG. 5, FIG. 5 is a block diagram illustrating an exemplary computing device 500 configured to generate and provide a knowledge-guided vector 116 with the input phrase to guide the tagging process of an RNN tagging module/service. The exemplary computing device 500 includes one or more processors (or processing units), such as processor 502, and a memory 504. The processor 502 and memory 504, as well as other components, are interconnected by way of a system bus 510. The memory 504 typically (but not always) comprises both volatile memory 506 and non-volatile memory 508. Volatile memory 506 retains or stores information so long as the memory is supplied with power. In contrast, non-volatile memory 508 is capable of storing (or persisting) information even when a power supply is not available. Generally speaking, RAM and CPU cache memory are examples of volatile memory 506 whereas ROM, solid-state memory devices, memory storage devices, and/or memory cards are examples of non-volatile memory 508.

As will be appreciated by those skilled in the art, the processor 502 executes instructions retrieved from the memory 504 (and/or from computer-readable media, such as computer-readable media 400 of FIG. 4) in carrying out various functions of providing a knowledge-guided vector 116 with the input phrase to guide the tagging process of an RNN tagging module/service as set forth above. The processor 502 may be comprised of any of a number of available processors such as single-processor, multi-processor, single-core units, and multi-core units.

Further still, the illustrated computing device 500 includes a network communication component 512 for interconnecting this computing device with other devices and/or services over a computer network, including other user devices. The network communication component 512, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 512, is typically comprised of hardware and/or firmware components (and may also include or comprise executable software components) that transmit and receive digital and/or analog signals over a transmission medium (i.e., the network.)

The illustrated computing device 500 also includes a knowledge encoding module 102. As set forth above, the knowledge encoding module 102, in conjunction with the various sub-component or cooperative components, generates a knowledge-guided vector 116 that is used by an RNN tagger 120 in tagging the various words and tokens of an input phrase, such as input phrase 101. These additional and/or cooperative components includes a parsing module 104, a vector encoding module 106, an attention weighting module 108, and a vector combination module 110.

As indicated above, the parsing module 104, in execution, causes the computing device to generate a linguistic, hierarchical structure of an input phrase, such as input phrase 101. More particularly, the parsing module 104 generates a hierarchical structure, such as hierarchical structure 200 of input phrase 101, comprising a discrete set of knowledge-guided substructures.

As set forth above, the vector encoding module 106 encodes the discrete knowledge-guided sub-structures generated by the parsing module 104 into corresponding vector representations. The attention weighting module 108 determines and assigns emphasis or weight to the various encoded vectors generated by the encoding module 106. As indicated above, the attention weighting module 108 assigns the emphasis/weight according to linguistic knowledge information, both local and/or external, such as may be found in linguistic knowledge base 522.

The vector combination module 110 combines the various encoded, weighted vectors into a single weighted sum vector 112. Also, the vector combination module 110 is configured, in execution, to combine an input vector (an encoded vector of the subject matter of the entire input phrase) with the weighted sum vector 112 to generate a knowledge-guided vector 116 that can be used by the suitably configured RNN tagging component 120 in tagging the input phrase according to the encoded knowledge in the knowledge-guided vector.

Regarding the various components of the exemplary computing device 500, those skilled in the art will appreciate that many of these components may be implemented as executable software modules stored in the memory of the computing device, as executable hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Moreover, in certain embodiments each of the various components of the exemplary computing device 500 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network as in known in the art.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for providing structural linguistic knowledge to a semantic tagging process, the method comprising:
    receiving, at a Knowledge-Guided Structural Attention Process (K-SAP), an input phrase to be semantically tagged;
    generating a hierarchical structure of the input phrase, the hierarchical structure comprising one or more discrete sub-structures;
    encoding each of one or more discrete sub-structures into an encoded vector;
    for each of the discrete sub-structures, determining an attention weight according to a linguistic importance of the discrete sub-structure, and associating the attention weight to each of the one or more discrete sub-structures to generate a weighted, encoded vector for each of the discrete sub-structures;
    generating a weighted sum vector, wherein the weighted sum vector is generated according to a content of each of the one or more discrete sub-structures and according to the corresponding attention weight of each of the one or more discrete sub-structures by combining the weighted, encoded vectors;
    combining the weighted sum vector with an input phrase vector, thereby generating a knowledge-guided vector corresponding to the input phrase, wherein the input phrase vector is generated by encoding the input phrase; and
    providing the knowledge-guided vector and the input phrase to a recurrent neural network (RNN) for semantic tagging.

2. The method of claim 1 further comprising, for each of the one or more discrete sub-structures:
    generating an encoded vector corresponding to each of the one or more discrete sub-structures according to a subject matter of each of the one or more discrete sub-structures; and
    incorporating the determined attention weight in the corresponding encoded vector.

3. The method of claim 2, wherein generating an encoded vector corresponding to each of the one or more discrete sub-structures according to the subject matter of each of the one or more discrete sub-structures comprises generating an encoded vector corresponding to each of the one or more discrete sub-structures according to the subject matter of each of the one or more discrete sub-structure and according to a linguistic knowledge base.

4. The method of claim 3, wherein the linguistic knowledge base comprises information indicating dependency relationships in phrases.

5. The method of claim 4, wherein the linguistic knowledge base is an external linguistic knowledge base.

6. The method of claim 2, wherein generating the weighted sum vector according to the content of each of the one or more discrete sub-structures as weighted and according to the corresponding attention weight of each of the one or more discrete sub-structures comprises generating the weighted sum vector according to the encoded vectors.

7. The method of claim 6, wherein the determined attention weight generated for each of the one or more discrete sub-structures is determined according to a similarity between the subject matter of each of the one or more discrete sub-structures and a subject matter of the input phrase.

8. The method of claim 7, wherein each of the one or more discrete sub-structures begins with a root node and includes those nodes from the root node down the hierarchical structure to a leaf node.

9. A computer readable medium bearing computer executable instructions which, when executed on a computing system comprising at least a processor, carry out a method for providing structural linguistic knowledge to a semantic tagging process, the method comprising:
    receiving at a Knowledge-Guided Structural Attention Process (K-SAP), an input phrase to be semantically tagged;
    generating a hierarchical structure of the input phrase, the hierarchical structure comprising one or more discrete sub-structures;
    encoding each of one or more discrete sub-structures into an encoded vector;
    for each of the one or more discrete sub-structures, determining an attention weight according to a linguistic importance of the discrete sub-structure, and associating the attention weight to each of the one or more discrete sub-structures to generate a weighted, encoded vector for each of the discrete sub-structures;
    generating a weighted sum vector, wherein the weighted sum vector is generated according to a content of each of the one or more discrete sub-structures and according to the corresponding attention weight of each of the one or more discrete sub-structures by combining the weighted, encoded vectors;
    combining the weighted sum vector with an input phrase vector thereby generating a knowledge-guided vector corresponding to the input phrase, wherein the input phrase vector is generated by encoding the input phrase; and
    providing the knowledge-guided vector and the input phrase to a recurrent neural network (RNN) for semantic tagging.

10. The computer readable medium of claim 9, wherein the method further comprises, for each of each of the one or more discrete sub-structures:

generating an encoded vector corresponding to each of the one or more discrete sub-structures according to a subject matter of each of the one or more discrete sub-structures; and incorporating the determined attention weight in the corresponding encoded vector.

11. The computer readable medium of claim 10, wherein generating an encoded vector corresponding to each of the one or more discrete sub-structures according to the subject matter of each of the one or more discrete sub-structures comprises generating an encoded vector corresponding to each of the one or more discrete sub-structures according to the subject matter of each of the one or more discrete sub-structures and according to a linguistic knowledge base.

12. The computer readable medium of claim 11, wherein the linguistic knowledge base comprises information indicating dependency relationships in phrases.

13. The computer readable medium of claim 12, wherein the linguistic knowledge base is an external linguistic knowledge base.

14. The computer readable medium of claim 10, wherein generating the weighted sum vector according to the content of each of the one or more discrete sub-structures as weighted and according to the corresponding attention weight of each of the one or more discrete sub-structures comprises generating the weighted sum vector according to the encoded vectors.

15. The computer readable medium of claim 14, wherein the determined attention weight generated for each of the one or more discrete sub-structures is determined according to a similarity between the subject matter of each of the one or more discrete sub-structures and a subject matter of the input phrase.

16. The computer readable medium of claim 15, wherein each of the one or more discrete sub-structures begins with a root node and includes those nodes from the root node down the hierarchical structure to a leaf node.

17. A computer system for providing structural linguistic knowledge to a semantic tagging process, the system comprising a processor and a memory, wherein the processor executes instructions in the memory as part of or in conjunction with additional components in providing structural linguistic knowledge to a semantic tagging process, the additional components comprising:

a knowledge encoding module configured to:

receive, at a Knowledge-Guided Structural Attention Process (K-SAP), an input phrase;

generate a hierarchical structure of the input phrase, the hierarchical structure comprising one or more discrete sub-structures;

encode each of one or more discrete sub-structures into an encoded vector;

for each of the one or more discrete sub-structures, determine an attention weight according to a linguistic importance of the discrete sub-structure, and associate the attention weight to each of the one or more discrete sub-structures to generate a weighted, encoded vector for each of the discrete sub-structures;

generate a weighted sum vector, wherein the weighted sum vector is generated according to a content of each of the one or more discrete sub-structures and according to the corresponding attention weight of each of the one or more discrete sub-structures by combining the weighted, encoded vectors;

determine a knowledge-guided vector corresponding to the input phrase, the knowledge-guided vector comprising the weighted sum vector generated from one or more discrete sub-structures of the input phrase combined with an input phrase vector, wherein the input phrase vector is generated by encoding the input phrase; and provide the knowledge-guided vector and the input phrase to a recurrent neural network (RNN) for semantic tagging of the input phrase.

18. The computer system of claim 17, wherein the knowledge encoding module determines a knowledge-guided vector corresponding to the input phrase in conjunction with a parsing module, and wherein the parsing module is configured to generate a linguistic hierarchical structure of the input phrase, the linguistic hierarchical structure comprising the one or more discrete sub-structures of the input phrase.

19. The computer system of claim 18, wherein the knowledge encoding module determines the knowledge-guided vector corresponding to the input phrase in conjunction with a vector encoding module; and wherein the vector encoding module is configured to generate an encoded vector corresponding to each of the one or more discrete sub-structures according to a subject matter of the corresponding one or more discrete sub-structures.

20. The computer system of claim 19, wherein the knowledge encoding module determines a knowledge-guided vector corresponding to the input phrase in conjunction with an attention weighting module; and wherein the attention weighting module is configured to determine an attention weight for each of the one or more discrete sub-structures according to the linguistic importance of the corresponding sub-structure, and associate the corresponding attention weight to the encoded vector of each of the one or more discrete sub-structures.

* * * * *